(12) United States Patent
Sella et al.

(10) Patent No.: US 10,079,758 B2
(45) Date of Patent: *Sep. 18, 2018

(54) BUFFER-LESS VIRTUAL ROUTING

(71) Applicant: Level 3 Communications, LLC, Broomfield, CO (US)

(72) Inventors: William Thomas Sella, Parker, CO (US); James Michael Sella, Parker, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 123 days.

This patent is subject to a terminal disclaimer.

(21) Appl. No.: 15/139,191

(22) Filed: Apr. 26, 2016

(65) Prior Publication Data
US 2016/0241470 A1    Aug. 18, 2016

Related U.S. Application Data

(63) Continuation of application No. 14/733,847, filed on Jun. 8, 2015, now Pat. No. 9,344,361, which is a
(Continued)

(51) Int. Cl.
*H04L 12/721* (2013.01)
*H04L 12/24* (2006.01)
(Continued)

(52) U.S. Cl.
CPC .......... *H04L 45/70* (2013.01); *H04L 41/0816* (2013.01); *H04L 41/0896* (2013.01);
(Continued)

(58) Field of Classification Search
None
See application file for complete search history.

(56) References Cited

U.S. PATENT DOCUMENTS 5,101,402 A    3/1992  Chiu et al.
6,314,085 B1  11/2001  Saranka
(Continued)

FOREIGN PATENT DOCUMENTS

WO   WO-2012081202 A1   6/2012
WO   WO-2015034754 A1   3/2015

OTHER PUBLICATIONS

International Preliminary Report on Patentability, dated Mar. 8, 2016, Int'l Appl. No. PCT/US14/053268, Int'l Filing Date Aug. 28, 2014; 7 pgs.
(Continued)

*Primary Examiner* — Chi H Pham
*Assistant Examiner* — Vladislav Agureyev

(57) ABSTRACT

A network includes a plurality of endpoint routers and intermediate routers. When a new data stream is detected at any endpoint router, the first packet is sent to a virtual routing server with knowledge of the entire network topology. Based on the topology, current usage, and historical usage, the virtual routing server determined a path for the data stream and begins to update the routing tables of the intermediate routers to reflect the determined path. Until the update is complete, all packets in the data stream are routed first to the virtual routing server and then to their destination. Once the update is complete, packets in the data stream are routed directly along the determined path.

26 Claims, 9 Drawing Sheets

Related U.S. Application Data continuation of application No. 14/105,977, filed on Dec. 13, 2013, now Pat. No. 9,054,997, which is a continuation of application No. 14/016,969, filed on Sep. 3, 2013, now Pat. No. 8,611,355.

(51) Int. Cl.

| | | |
|---|---|---|
| *H04L 12/26* | (2006.01) | |
| *H04L 12/751* | (2013.01) | |
| *H04L 12/727* | (2013.01) | |
| *H04L 12/729* | (2013.01) | |
| *H04L 12/707* | (2013.01) | |
| *H04L 12/717* | (2013.01) | |
| *H04L 12/723* | (2013.01) | |
| *H04L 12/713* | (2013.01) | |
| *H04L 12/851* | (2013.01) | |

(52) U.S. Cl.
CPC ............ *H04L 43/087* (2013.01); *H04L 45/02* (2013.01); *H04L 45/121* (2013.01); *H04L 45/125* (2013.01); *H04L 45/22* (2013.01); *H04L 45/42* (2013.01); *H04L 45/44* (2013.01); *H04L 45/502* (2013.01); *H04L 45/566* (2013.01); *H04L 45/586* (2013.01); *H04L 47/24* (2013.01); *H04L 45/10* (2013.01); *H04L 45/123* (2013.01)

(56) References Cited

U.S. PATENT DOCUMENTS

| | | | |
|---|---|---|---|
| 6,412,000 B1 | 6/2002 | Riddle et al. | |
| 6,526,044 B1 | 2/2003 | Cookmeyer et al. | |
| 6,654,369 B1 | 11/2003 | Pelissier et al. | |
| 6,873,600 B1 | 3/2005 | Duffield et al. | |
| 7,092,395 B2 | 8/2006 | He et al. | |
| 7,403,988 B1 | 7/2008 | Blouin et al. | |
| 7,568,047 B1 * | 7/2009 | Aysan ................... | H04L 45/02 370/352 |
| 7,668,087 B2 * | 2/2010 | Hussain ................ | H04L 43/026 370/230 |
| 7,706,291 B2 | 4/2010 | Luft et al. | |
| 7,773,536 B2 | 8/2010 | Lloyd et al. | |
| 7,788,354 B2 | 8/2010 | Nag | |
| 7,940,676 B2 | 5/2011 | Griffin et al. | |
| 7,953,865 B1 * | 5/2011 | Miller .................. | H04L 12/6418 370/254 |
| 7,970,930 B2 | 6/2011 | Dobbins et al. | |
| 8,265,071 B2 | 9/2012 | Sindhu et al. | |
| 8,300,650 B2 | 10/2012 | Rojas-Cessa et al. | |
| 8,509,078 B2 | 8/2013 | Moscibroda et al. | |
| 9,967,191 B2 * | 5/2018 | Frost ...................... | H04L 45/50 |
| 2005/0259665 A1 | 11/2005 | Norden | |
| 2006/0153191 A1 * | 7/2006 | Rajsic .................. | H04L 12/5601 370/392 |
| 2007/0041326 A1 * | 2/2007 | Babiarz ............... | H04L 41/5022 370/237 |
| 2011/0196971 A1 | 8/2011 | Reguraman et al. | |
| 2011/0261697 A1 | 10/2011 | Crisan et al. | |
| 2012/0134497 A1 | 5/2012 | Roitshtein et al. | |
| 2012/0170582 A1 | 7/2012 | Abts et al. | |
| 2012/0250535 A1 * | 10/2012 | Delling ................... | H04L 45/12 370/252 |
| 2013/0329548 A1 * | 12/2013 | Nakil .................. | H04L 41/0668 370/228 |
| 2013/0329584 A1 * | 12/2013 | Ghose .................. | H04L 45/586 370/252 |
| 2015/0009809 A1 * | 1/2015 | Zhang ..................... | H04L 47/35 370/230 |
| 2015/0010001 A1 * | 1/2015 | Duda ...................... | H04L 45/74 370/392 |
| 2015/0063359 A1 | 3/2015 | Sella et al. | |
| 2015/0244617 A1 * | 8/2015 | Nakil .................. | G06F 9/45558 709/224 |
| 2015/0312145 A1 | 10/2015 | Sella et al. | |
| 2017/0195289 A1 * | 7/2017 | Sun ........................ | H04L 63/029 |

OTHER PUBLICATIONS

International Search Report, dated Dec. 4, 2014, Int'l Appl. No. PCT/US14/053268, Int'l Filing Date Aug. 28, 2014; 4 pgs.

"OpenFlow Switch Specification", Version 1.1.0 Implemented (Wire Protocol 0x02) Feb. 28, 2011, 56 pgs.

"Wikipedia (the free encyclopedia)", Open Flow Jun. 24, 2013, 3 pgs.

Written Opinion of the International Searching Authority, dated Dec. 4, 2014, Int'l Appl. No. PCT/US14/053268, Int'l Filing Date Aug. 28, 2014; 6 pgs.

McKeown, Nick et al., "OpenFlow: Enabling Innovation in Campus Networks", Mar. 14, 2008, 6 pgs.

European Examination Report, dated Jul. 6, 2018, Application No. 14766844.6, filed Aug. 28, 2014, 3 pgs.

\* cited by examiner

BUFFER-LESS VIRTUAL ROUTING

BACKGROUND

Field

This field is generally related to network routing.

Related Art

A communication network may, for example, provide a network connection that allows data to be transferred between two geographically remote locations. A network connection may span multiple links with different capacities. Networks may have different topologies depending on how the links are connected to each other through routing devices.

Depending on the network topology, multiple routes may be available for a connection. Traditional routing algorithms rely on local information each router has from its surroundings to route data. A router maintains the information about its neighboring connections in a routing table. Based on the destination address of an incoming packet, a router uses its routing table to forward the packet to a neighboring router.

While using only local information and the packet destination for routing may be desirable in some contexts, it may not always route data intelligently. For example, it may result in bottlenecks. For that reason, other techniques use the global knowledge of the network topology to route packets. Such global knowledge can provide an optimum route based on the current traffic load in different parts of the network. This approach also enables connections to balance their traffic loads on multiple parallel connections, if necessary.

BRIEF SUMMARY

In an embodiment, a computer-implemented method virtually routes a data stream from a source to a destination through a plurality of interconnected routers. The method includes receiving an initial packet in the data stream. In response to receipt of the initial packet of the data stream, the initial packet is transmitted with routing instructions indicating to downstream routers how to route the initial packet to the destination. Also, a path is determined through plurality of interconnected routers from the source to the destination. For respective routers along the path, a routing table indicating which port the router will route data from the data stream to is determined such that data from the data stream will be routed along the determined path. The routing tables are transmitted to configure the respective routers. Until the respective routers that are configured to route data from the data stream along the path, additional packets from the data stream received and the additional packets are transmitted with routing instructions indicating to downstream routers how to route the initial packet to the destination.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1:
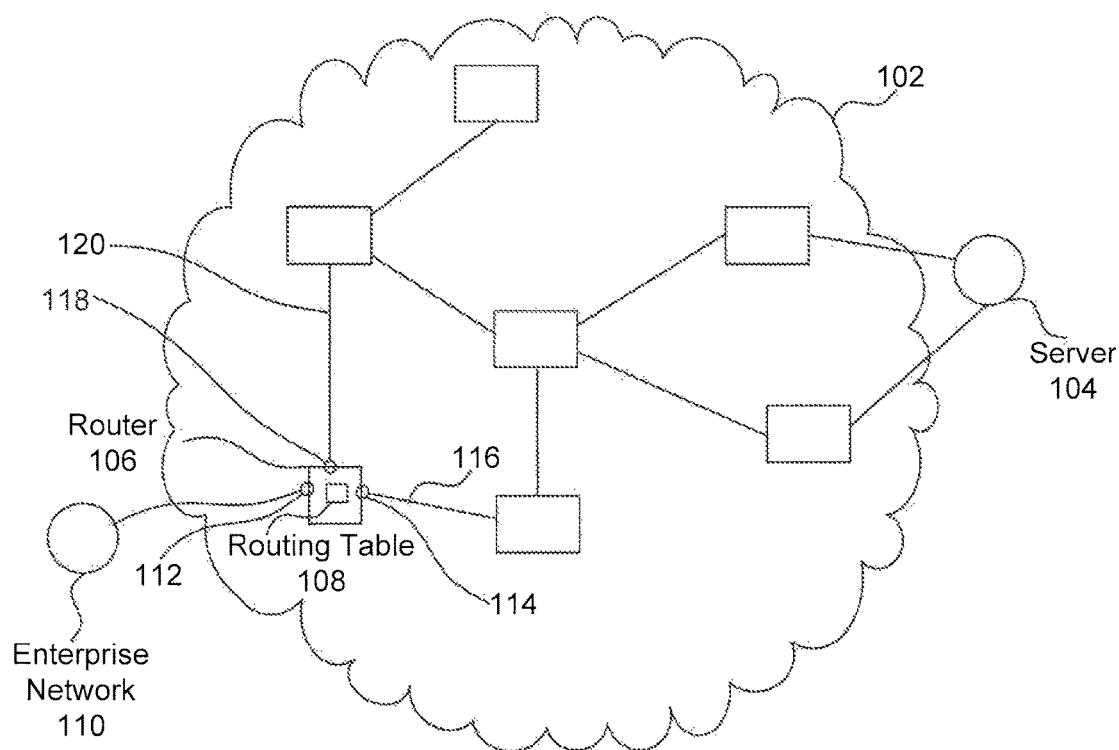
FIG. 1 is a diagram that illustrates a system for providing a connection to a user of a network.

As mentioned above, routing techniques that use global knowledge of the network topology may be able to route packets in a more intelligent manner. However, those routing techniques tend not to be scalable. Determining a route can take a substantial amount of time. During that time, initial packets in a connection flow may be buffered, potentially consuming a large amount of memory in an edge router and even dropped if the buffer space is exhausted and path computation takes too much time. Embodiments disclosed here route data streams in an intelligent manner based on global network knowledge without requiring initial packets to be buffered at an edge router.

To route data, embodiments use a virtual routing server (or set of virtual routing servers distributed throughout the network), sometimes referred to as a virtual router. The virtual router may connect to all physical routers in the network and gather information related to network operation such as traffic load, link latencies, link jitter, link packet loss, and link failures. Using such information, the virtual router is in the best position to provide an optimized route for a data stream.

The topology of the network, including how the links are interconnected with routers, is known by the virtual router. Ports on the virtual router are not only connected to the router ports that the users interface with, but also the ports that routers use to communicate with each other. The virtual router gathers information from the network routers' ports. The virtual router keeps the knowledge of the network topology and information about links and routers of the network in its virtual backplane.

Using information regarding its virtual backplane, the virtual router establishes default paths to and from each destination port in the network. Using the default paths, the virtual router keeps packets of a new connection flowing to the destination while it sets up a direct path for the data stream through the physical routers. In this way, the virtual router avoids the need for large buffers at edge routers to keep the incoming packets. Additionally, the first packets of a new stream reach their final destination with a minimum amount of added latency (the total latency from Port A to the Virtual Router plus the total latency from the Virtual Router to Port B plus the total processing time in the Virtual Router).

The Detailed Description that follows is divided into five sections. The first section describes, with respect to FIGS. 1-2, a network using conventional routing techniques and how the network may be improved using a virtual router. The second section describes, with respect to FIGS. 3 and 4A-C, using the virtual router without requiring edge routers to buffer a large amount of packets. The third section describes, with respect to FIG. 5, detecting parts of the connection routes that are shared and using this information to simplify routing tables and reduce the amount of required packet forwarding memory. The fourth section describes, with respect to FIG. 6, tearing down a connection that is no longer needed. The fifth and final section describes, with respect to FIG. 7, a virtual routing server system and its modules.

Virtual Routing

FIG. 1 illustrates a system 100 that provides a communication network 102. The communication network 102 may be a local area network (LAN), metropolitan area network (MAN), or wide area network (WAN). It may utilize any point-to-point or multipoint-to-multipoint networking protocols. The network access protocols used may include, for example, Multi Label Protocol Switching (MPLS), Ethernet, Asynchronous Transfer Mode (ATM), High-Level Data Link Control (HDLC), or Frame Relay.

Communication network 102 includes a plurality of routers, such as router 106, interconnected by links, such as links 116 and 120. Communication network 102 connects to an enterprise network 110 and a server 104. Enterprise network 110 may, for example, be an organization's internal network. Enterprise network 110 and server 104 may be at geographically remote locations. Here, the term "router" refers to devices that switch packets, including devices at the data link layer (OSI layer 2) and the network layer (OSI layer 3).

Enterprise network 110 connects to network 102 via a port 112 on router 106. In an example, enterprise network 110 may send data to server 104. The data may be a stream divided into packets, and each packet may specify server 104 as its destination. To send the data, enterprise network 110 sends the packets to router 106.

Router 106 includes a routing table 108. Using routing table 108, router 106 determines which port to send the packets to based on their destination. Routing table 108 can be updated based on the information that router 106 discovers in its neighborhood through a route discovery protocol such as ICMP Router Discovery Protocol (IRDP), Route Information Protocol (RIP), Open Shortest Path First (OSPF), or Enhanced Interior Gateway Routing Protocol (EIGRP).

In the example above, router 106 utilizes routing table 108 to look up which port to forward packets destined for server 104. The routing table 108 may mandate that router 106 send all packets addressed to server 104 out port 114 to link 116. In fact, router 106 may send data destined for server 104 on link 116 even when that link is congested. Because of the rigidity of the rules in routing table 108, router 106 may not recognize that it can also send data addressed to server 104 along another route, for example out a port 118 along link 120. To deal with this, a virtual router may be used to route data more intelligently, as illustrated in FIG. 2.

Figure 2:
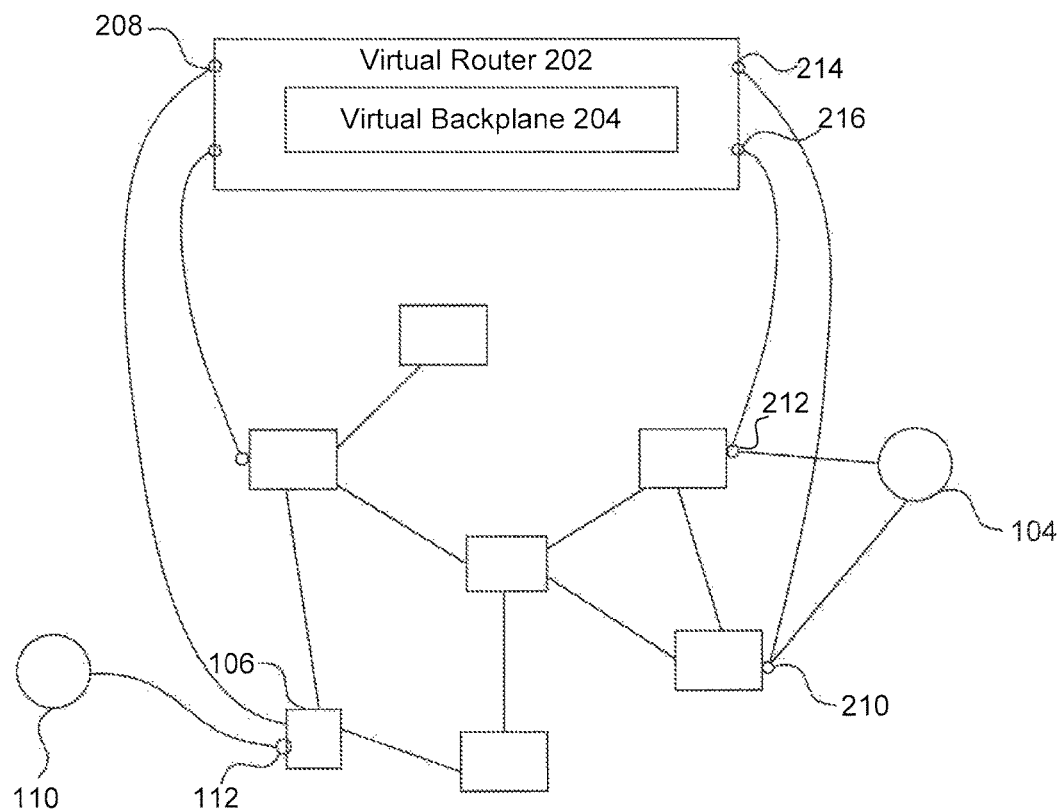
FIG. 2 is a diagram that illustrates a virtual router connected to ports of the network routers.

FIG. 2 illustrates a system 200 that provides a virtual router 202. Virtual router 202 is connected to all the ports on all the network routers and gathers information of the network topology in a virtual backplane 204. For example, a port 208 on the virtual router is a virtual representation of port 112 on router 106. Port 208 is a virtual representation of port 112.

In an embodiment, when the users connect to ports on the physical network routers, such as port 208, they also connect to virtual router 202, and in the case of multiple virtual routers for redundancy purposes, they may also connect to other virtual routers which also represent the physical network. In particular, when the users connect to ports on the physical network routers, virtual router 202 (or some other mirror copy of virtual router 202) receives and processes a new connection request. In other words, from the user's perspective the entire the communication network is a single virtual router having ports that the user can access.

Virtual router 202 uses the information in virtual backplane 204 to populate the routing tables in the network routers, such as router 106. Virtual router 202 operates as a central controller that has overall knowledge of the network and is capable of updating the routing table of the routers with a view of the network as a whole.

In an embodiment, network 102 may include multiple domains using different network protocols. In that embodiment, virtual router 202 also spans across all the network domains, so that users of the network only see one virtual router, rather than a heterogeneous network with different protocols. In this way, virtual router 202 may simplify what the users see as a network. For users, they are dealing with only one virtual router with many ports.

In addition to simplifying a network, virtual router 202 can also create multiple routing and forwarding tables for a given connection to provide load balancing. In this approach, virtual router 202 enables enterprise network 110 to send its traffic on multiple paths in the network. One reason for this approach is more flexibility in meeting a user's service level agreement. For example, if the user has strict a bandwidth requirement and virtual router 202 cannot find any single route in the network to provide such bandwidth, it balances traffic between two routes that together meet the required bandwidth. In this approach, the network can balance the user's traffic over more than one route.

Outside of load balancing, virtual router 202 can also use other constraints to determine a route for packets to take through the network. For example, certain data streams may be required to go through a scrubbing server that filters information those packets contain. In that example, virtual router 202 determines a path that routes the packets through that specific server or one or more of that particular class of servers, such as a group of firewall servers. This may involve selecting one of the servers belonging to the class and determining the path to route packets through the selected server.

Figure 3:
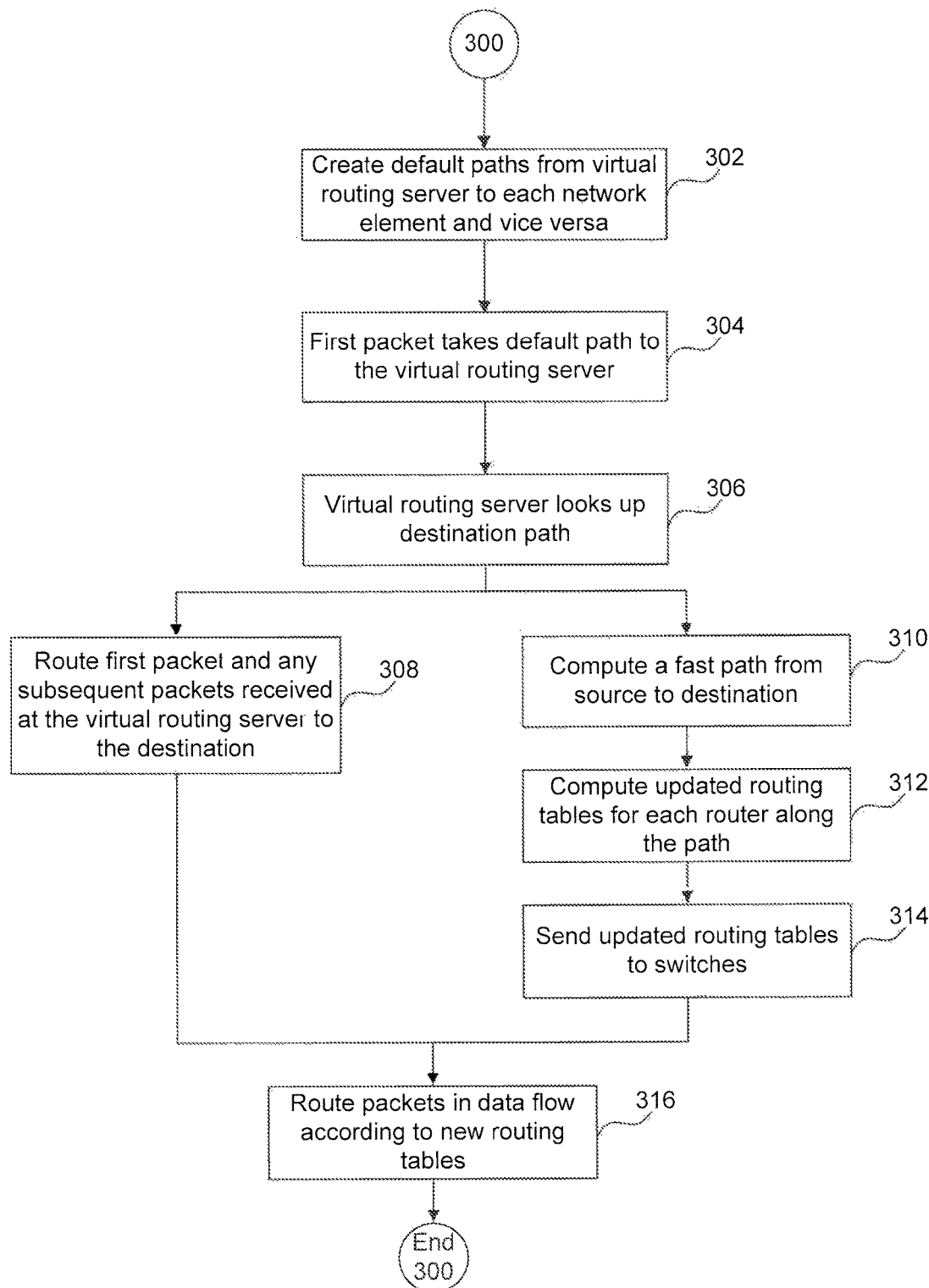
FIG. 3 is a flowchart that illustrates a method for determining routes for network connections using a virtual router.

In an embodiment, virtual router 202 may operate as illustrated in FIG. 3.

Buffer-Less Virtual Routing

Figure 4A:
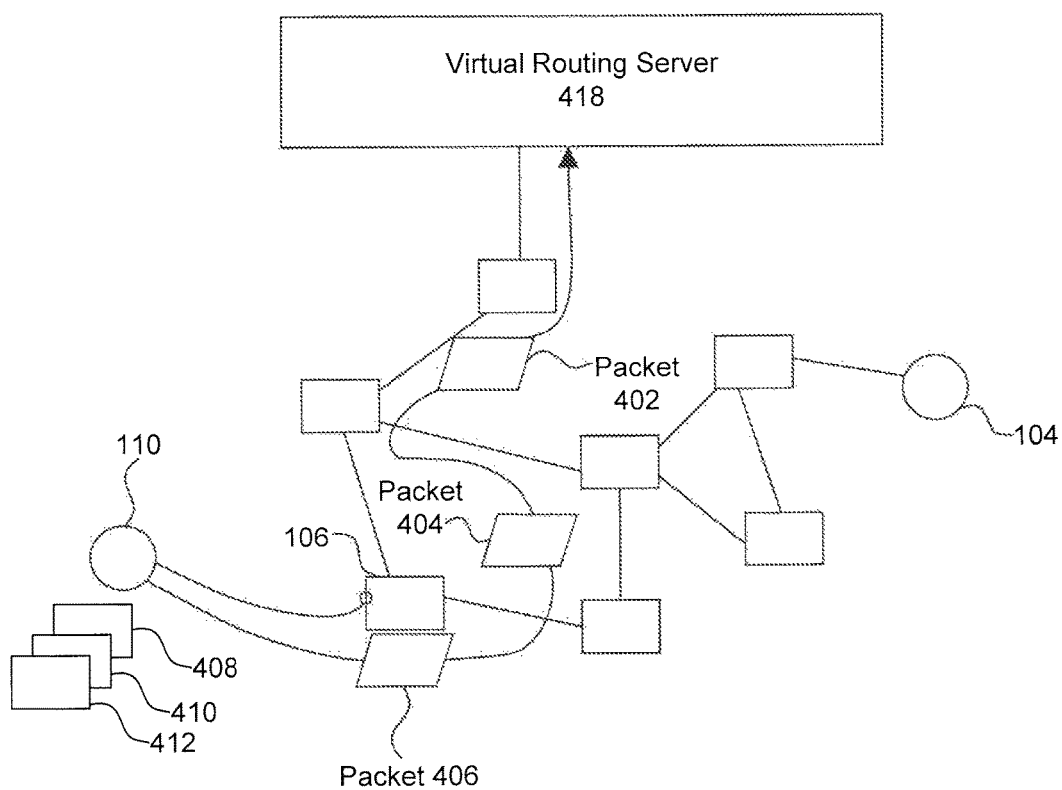
FIG. 4A is a diagram illustrating a network connection using a dedicated path to the virtual server.
Figure 4B:
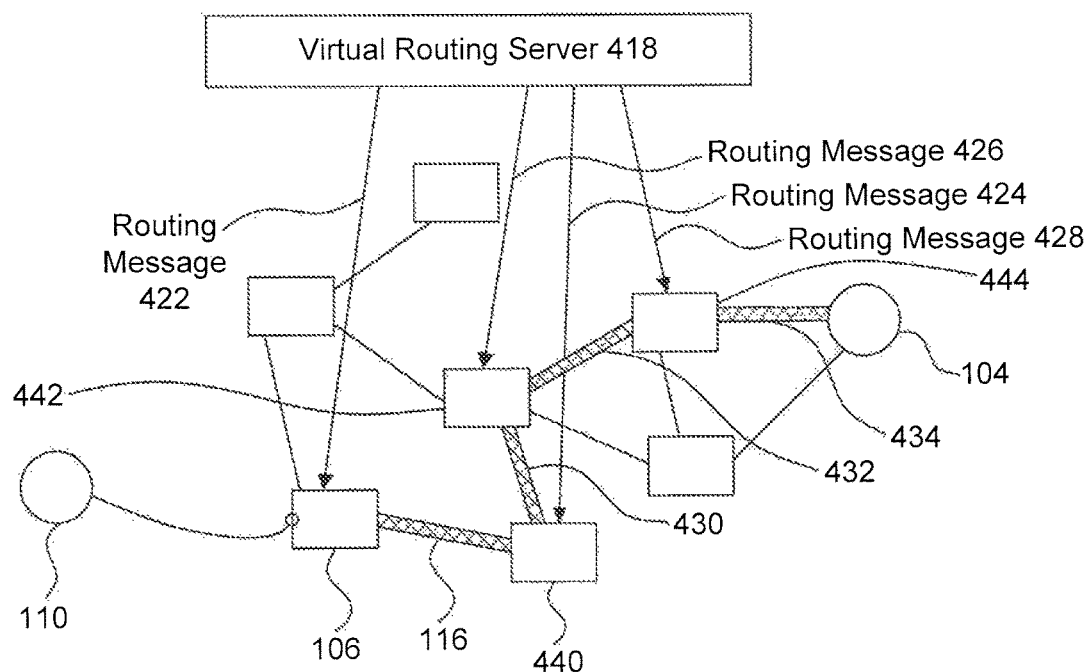
FIG. 4B is a diagram illustrating a fast route set up by the virtual router for a connection.
Figure 4C:
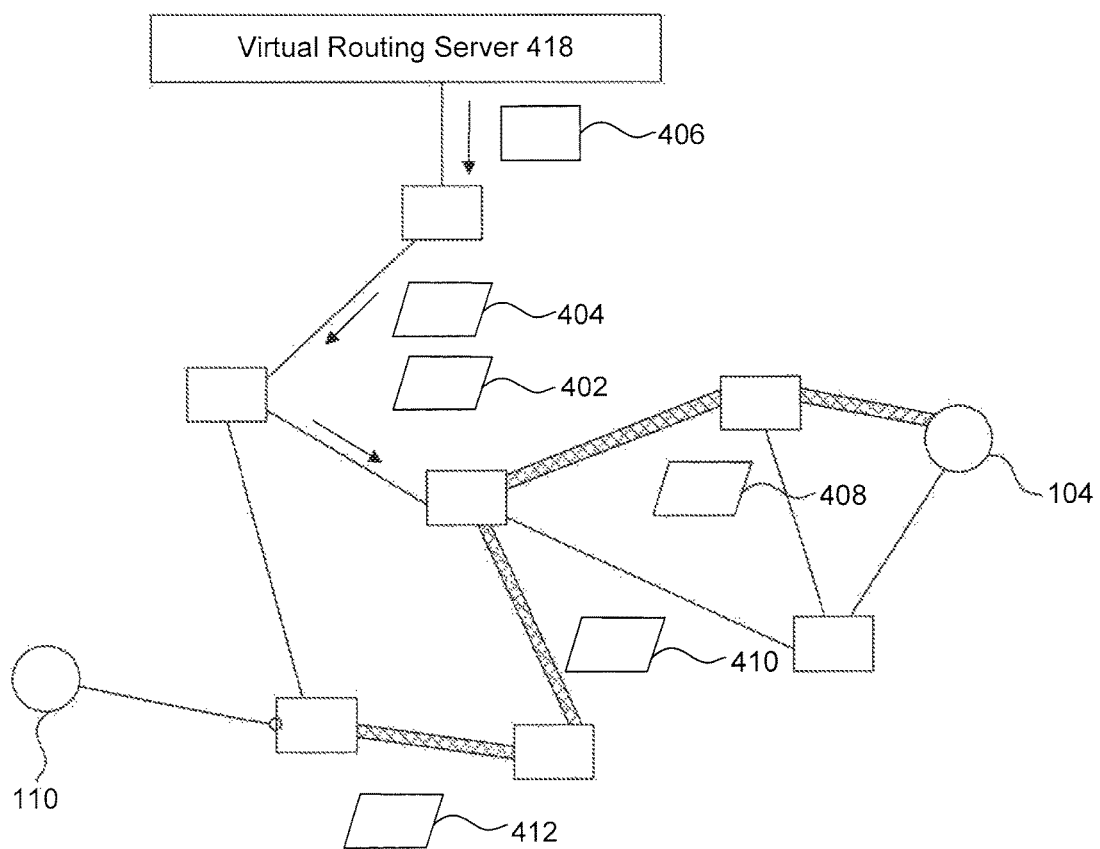
FIG. 4C is a diagram that illustrates sending initial connection packets to the destination through the virtual server and continuing the packet flow on the fast route.

FIG. 3 is a flowchart that illustrates a method 300 for setting up a connection path. Method 300 is described with respect to the example illustrated in FIGS. 4A-C. FIGS. 4A-C illustrate how a virtual routing server 418 sets up a path for a new data stream.

Referring to FIG. 3, method 300 starts at step 302 to determine default paths to and from the virtual routing server. In particular, a default path is determined from the virtual routing server to each network element. These default paths are stored at the virtual routing server. Also at this step, a default path is determined from each network element to the virtual router. These default paths are stored in each respective router.

At step 304, the first packet of a new data stream arrives at an edge router. A new data stream may be identified, for example, by its source and destination ports and addresses. Additionally, a new data stream may be defined by the contents of the packet, and not header information. Any trinary (set, unset, don't care) bit pattern may identify a particular data stream. The packet may take the default path from the edge router to the virtual routing server. To take the default path, the edge router may attach routing instructions to the first packet that tells each downstream router how to forward the packet along the path. Alternatively, the edge router may be involved in attaching a label to the packet. Downstream routers may recognize the label and know, based on the label, how to forward the packet toward the virtual routing server. An example data stream is illustrated in FIG. 4A.

FIG. 4A shows a diagram 400 illustrating a data stream from enterprise network 110 addressed to server 104. The data stream includes packets 402, 404, 406, 408, 410, and 412. When the first packet of the data stream-packet 402—reaches router 106, it is routed to virtual routing server 418. Virtual routing server 418 determines that this packet belongs to a new connection and starts the process of establishing a fast path for the connection, which does not flow through the virtual routing server 418.

In the example, after packet 402, packets 404 and 406 are also sent. Instead of buffering packets 404 and 406 at router 106, router 106 forwards those packets onto virtual routing server 418, just as it did with the first packet 402.

Referring back to FIG. 3, after the virtual routing server receives the first packet, it looks up a path from the virtual routing server to the destination. This path was previously determined in step 302.

Next, method 300 establishes a new path from the connection source to the destination in steps 310, 312 and 314. In parallel to these steps, at step 308, process 300 routes the first and any subsequent packets received at the virtual routing server to the destination.

At step 310, the virtual routing server computes a path from source to the destination. The path comprises network links and routers, but not the virtual router. For example, using the MPLS protocol, the virtual router will create a label-switched path (LSP) for the data stream. To determine the path, the virtual routing server may take into account current or historical bandwidth usage. For example, the virtual routing server may consider network usage during previous weeks (or another cyclical period). The virtual router may also create multiple paths for the connection to enable load balancing on multiple paths.

The virtual routing server may also take into account latency, jitter, packet loss, or any other performance metric across various paths, the user's service level agreement, or the type of data being transferred. For example, broadcast video data may require a great deal of bandwidth, but latency may be relatively unimportant. Voice-over-IP (VoIP) data, on the other hand, may not require as much bandwidth, but latency may be more important. For broadcast video data, the virtual routing server could select a high-bandwidth, high-latency path, and, for VoIP data, the virtual routing server could select a low-bandwidth, low-latency path.

In another embodiment, the virtual routing server may route data through a particular server. For example, data having a certain type or directed to a certain destination may need to be scrubbed by a particular scrubbing server en route. The scrubbing server may be used to scan the data for malicious content, to monitor incoming data, or to perform other analysis on the data. In that embodiment, the virtual routing server may determine such that it goes through the particular scrubbing server or set of servers.

At step 312, the virtual router computes updated routing tables for each router along the path. If multiple paths are computed for the data stream, method 300 will create routing tables in accordance with all the paths. In one embodiment, the updated routing tables may instruct the router how to forward packets having a particular combination of source/destination addresses and source/destination ports. In an alternative embodiment, the data stream may be identified with a label and the updated routing table may indicate how to forward packets having the label. The routing tables may also instruct that converging paths be relabeled, as described below with respect to FIG. 5.

At step 314, the virtual router sends updated routing tables to network routers. The virtual router can use the dedicated paths established to all the network routers in step 302 to send the routing tables.

An example of how a path is determined and how the routers are configured, as described in steps 310, 312, and 314, as illustrated in FIG. 4B.

FIG. 4B shows a diagram 420 illustrating how virtual routing server 418 configures the network routers to establish the path between enterprise network 110 and server 106.

In FIG. 4B, virtual routing server 418 determines that the data stream between enterprise network 110 and server 106 will follow the path including links 116, 430, 432, and 434 and routers 106, 440, 442, and 444. To configure the routers, the virtual router 418 sends the updated routing tables using the routing messages 422, 424, 426, and 428. These routing messages configure all the routers on the fast path connecting enterprise network 110 to server 106. In particular, message 422 instructs router 106 to forward packets in the data stream to link 116; message 424 instructs router 440 to forward packets in the data stream to link 430; message 426 instructs router 442 to forward packets in the data stream to link 432; and message 428 instructs router 444 to forward packets in the data stream to link 434.

In an embodiment, to ensure that packets continue to flow through the virtual router until the path is fully established, routers along the path are configured from the egress point (router 104) to the ingress point (router 106). First, message 428 configures router 444. Second, message 426 configures router 442. Third, message 424 configures router 440. Fourth, message 422 configures router 106.

Referring back to FIG. 4A, until the path is established, enterprise network 110 continues to transmit packets of the data stream—packets 402, 404, and 406. As mentioned above, router 106 continues to direct these packets to on the default path to virtual routing server 418.

On receipt of these packets, virtual routing server 418 routes them to their destination using the previously determined default path at step 308 in FIG. 3. In this way, while the path through the network is being established (as illustrated in FIG. 4B), packets continue to be routed to their destination, avoiding the need to buffer the initial packets in the edge router. A single physical network may be mirrored on multiple virtual routers with multiple virtual backplanes for redundancy purposes. Each of these virtual routers has default paths established between themselves and each router in the network. In the even that a default path to one virtual device is failed, traffic may choose a default path to a different virtual router.

Once the path is set up (e.g., the routers are configured with their new routing tables), data streams along the path at step 316. At this point, data may flow at a greater rate and lower end to end latency, since it no longer goes through the virtual router.

FIG. 4C shows a diagram 440 illustrating how data may flow after the path is established. In the example, packets 402, 404, and 406 were transmitted before the path was established, and packets 408, 410, and 412 were transmitted after the path was established. Packets 402, 404, and 406 are routed by virtual routing server 418 along the default path to server 104. Packets 408, 410, and 412, on the other hand, are transmitted to server 104 over the established path.

Converging Connection Paths

In practice, configuring routing tables that identify how to forward each individual data stream (instead of data directed to each destination) may be cumbersome. The routing tables may consume a large amount of memory in the routers, impeding their performance or limiting the overall number of data streams the router can service, thus limiting the maximum number of network users at a single point in time. To deal with this, some embodiments utilize convergence between paths to simplify the routing tables and reduce their memory footprint. For example, the path of two different data streams to the same destination may converge at a particular router en route. In this embodiment, the routing tables downstream of the particular router may not need individual entries for each data stream. Both data streams could share a common label, and the downstream routers only need to know how to route data with that label. Thus, taking advantage of this convergence can reduce the routing table entries needed from two to one.

To take advantage of this convergence, the virtual routing server may assign a label or other identifier to each data stream. The virtual routing server may instruct the edge router to assign the label to packets in the data stream. The virtual routing server may also instruct the router where multiple data streams converge to relabel one or more of the data streams such that their packets share a common identifier. The relabeling may involve replacement of a unique flow label with a common flow label. This is illustrated for example with respect to FIG. 5. Additionally, in the case of a label-based forwarding such as MPLS, the relabeling may involve preserving the original flow label by label stacking the common flow identifier above the unique flow label. This both reduces the switching memory required by aggregating both flows into a single flow to the destination but also preserves the individual nature of each independent flow.

Figure 5:
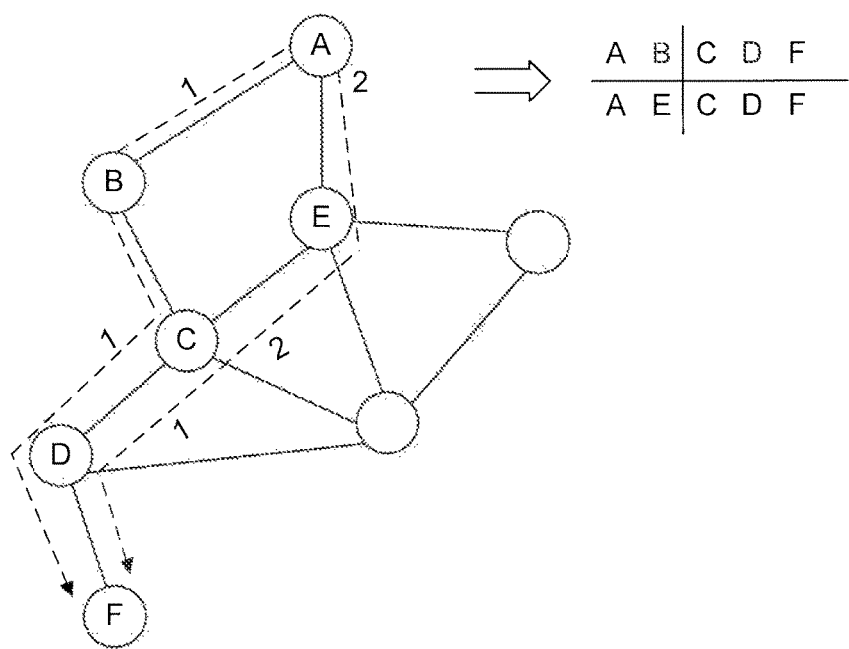
FIG. 5 is a diagram that illustrates two network connections converging at a network node.

FIG. 5 shows a network 500 where two data streams are established from router A to router F. Data stream 1 traverses routers A, B, C, D, and F and data stream 2 traverses routers A, E, C, D, and F.

Once the virtual router determines that data streams 1 and 2 converge at router C, it instructs router C to re-label data stream 2 to 1, so that both data stream have a common identifier 1 on section that spans over routers C, D, and F. The routing tables in routers C, D, and F need only know how to forward packets with the identifier "1," as opposed to knowing how to forward packets with both the identifiers "1" and "2."

Tearing Down Connection Routes

Figure 6:
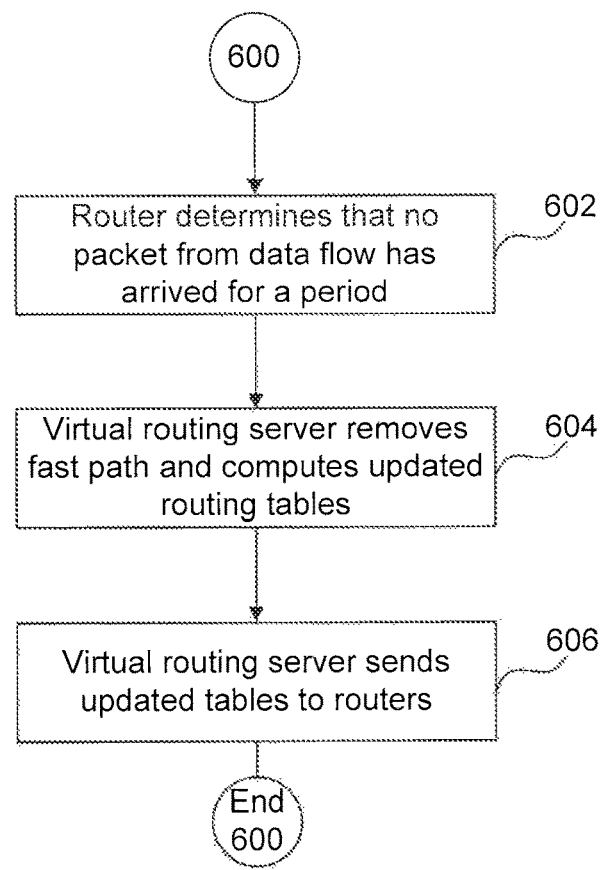
FIG. 6 is a flowchart that illustrates tearing down a fast connection after a period of inactivity.

FIG. 6 shows a method 600 to tear down a connection if no packets arrive for the connection for a period of time.

At step 602, method 600 determines that no packet has arrived for a particular data stream in a given period of time. In embodiment, network routers monitor the arrival of packets and if there is a period of silence for a data stream, in which no packet for that data stream arrives, the router identifies the virtual router or set of virtual routers that represent the physical network.

At step 604, the virtual router updates the routing tables to reflect removal of the path. At step 606, the virtual router sends updated tables to the routers on the path. After, the path is removed.

Virtual Routing Server Modules

Figure 7:
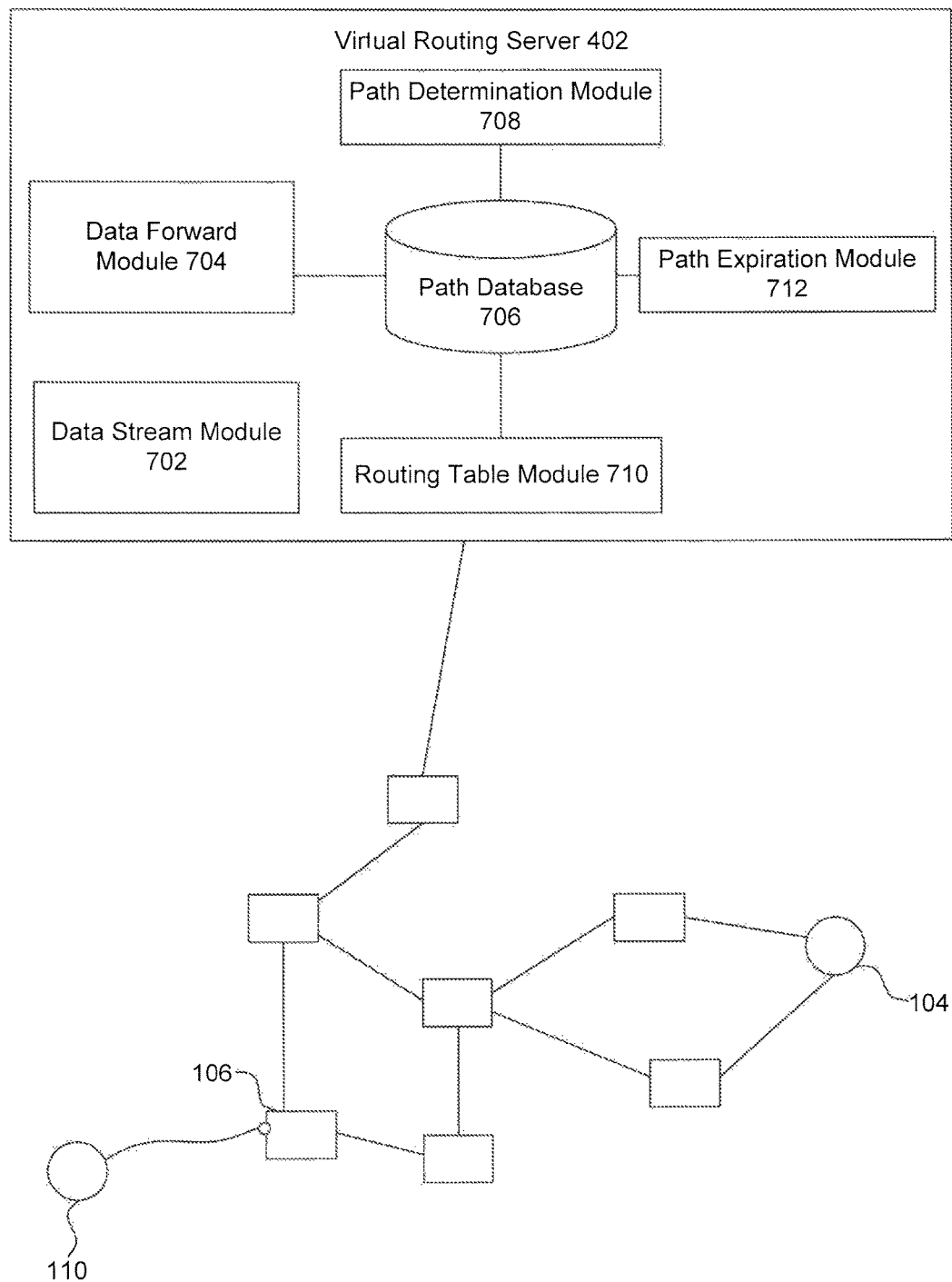
FIG. 7 is a diagram that illustrates modules of a virtual routing server.

FIG. 7 shows a diagram 700 illustrating virtual routing server 402 and its modules. In particular, virtual routing server 402 includes a data stream module 702, a data forward module 704, a path database 706, a path determination module 708, a routing table module 710, and a path expiration module 712. The various modules may operate as described above with respect to the method in FIG. 3.

Data stream module 702 receives the packets in a data stream as they enter the virtual router. The packets may be from a new data stream that does not yet have an established direct path through the network from a source to a destination or it may be a stream with an already established direct path through the network.

As data stream module 702 receives the packets in the data streams, data forward module 704 continuously re-transmits the packets to their destination or set of destinations if the flow is a multicast or broadcast stream. In particular, it may attach routing instructions to the packet indicating to each downstream network router how to route the packets to the destination (or set of destinations). Data forward module 704 repeats this retransmission until the interconnected routers are configured to route data from the data stream along a determined path. In the event of a fast path failure, this (or another) virtual routing system may also forward future packets from this stream before building a replacement path for the failed fast path.

Path database 706 keeps the inventory of all the paths in the network. To provide the SLA requirements of the users, the virtual router keeps a database of all paths in the network. Using this database and perhaps other information about current and historic network usage, the virtual router can approximate the availability of network resources. Using the approximate available resources, the virtual router can determine what resources to assign to a new connection to meet its service level requirements. It may also decide to replace existing fast path routes through the network with new paths to better rebalance traffic volumes or meet a broader range of SLA for multiple flows.

Path determination module 708 determines a path through a plurality of interconnected routers from a source to a destination. In one embodiment, it may select the path from a plurality of different available paths connecting the source to the destination based on the relative amount of available capacity or based on the relative latency of the plurality of different paths. In another embodiment, path determination module 708 may determine the path such that data from the data stream will pass through a particular machine or class of machines in the network.

According to the determined path, routing table module 710 determines routing tables for respective routers along the path. In particular, for each of the respective routers, routing table module 710 may determine a routing table indicating which port to route data from the data stream. The routing tables indicate how to forward data such that data from the data stream will be routed along the path. Routing table module 710 also transmits the respective routing tables to configure the respective routers along the path.

When a connection is expired, path expiration module 712 receives a message from a router along the path indicating that the router has not received data from the data stream for a particular period of time. Path expiration module 712 removes the path from path database 706. Path expiration may also be accomplished at the individual router level with each router maintaining a set of active streams and if no data is received on the stream for a particular time, the stream is removed from that router only. Each router in the path will then eventually expire the stream from its memory. In addition, each individual router will signal to the Path Expiration Module 712 to ensure that the path is removed from monitoring.

With the path removed, routing table module 710 determines a new routing table for each of the respective routers along the path. The new routing tables may not indicate where to route data from the data stream. Once determined, routing table module 710 transmits the new routing tables to configure the routers. The virtual router may update the entire routing table of each physical router in the path, or it may simply update a portion of the table by removing, adding, or modifying entries of the table.

Conclusion

The term "user," as used herein, may encompass both a customer of the network connectivity service, such as an employee of a business that utilizes the network connectivity service, and a network administrator of the service provider itself. Users may also be at different companies or organizations.

Path database 706 may be any stored type of structured memory, including a persistent memory. In examples, each database may be implemented as a relational database or file system.

Each of the servers and modules in FIG. 7 may be implemented in hardware, software, firmware, or any combination thereof.

Each of the servers and modules in FIG. 7 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for virtually routing a first data stream from a source to a destination, comprising:
    (a) determining, by an edge router, a first virtual router and a pre-computed path from the edge router to the first virtual router;
    (b) in response to receiving a first packet in the first data stream by the edge router, sending, by the edge router, the first packet to the first virtual router along the pre-computed path;
    (c) receiving, by the edge router, a first instruction from the first virtual router to configure the edge router to route data such that at least a first portion of the first data stream is routed along a first path determined through a plurality of interconnected routers from the source to the destination; and
    (d) configuring the edge router according to the first instruction received in (c).

2. The computer-implemented method of claim 1, further comprising:
    (e) after the configuring in (d), receiving a second packet in the first data stream by the edge router; and
    (f) in response to the receiving the second packet in (e), sending the second packet along the first path identified in the first instruction received in (c) to the destination.

3. The computer-implemented method of claim 1, wherein the determining in (a) comprises selecting the first virtual router from a plurality of virtual routers.

4. The computer-implemented method of claim 1, wherein the receiving in (c) comprises receiving, by the edge router, the first instruction from the first virtual router to configure the edge router to route data such that at least the first portion of the first data stream is routed along the first path through the plurality of interconnected routers from the source to the destination, and at least a second portion of the first data stream is routed along a second path, different from the first path, through the plurality of interconnected routers from the source to the destination.

5. The computer-implemented method of claim 4, wherein a determination of the first path and the first portion, and the second path and the second portion in (c) is made such that a pre-determined quality-of-service requirement by the first data stream is met.

6. The computer-implemented method of claim 1, wherein the first path is selected from a plurality of different paths connecting the source to the destination based on a relative amount of available capacity on the plurality of different paths.

7. The computer-implemented method of claim 1, wherein the first path is selected from a plurality of different paths connecting the source to the destination based at least on one of a relative latency, jitter, or packet loss on the plurality of different paths.

8. An edge router for virtually routing data streams, comprising:
- a routing table specifying a first default path from the edge router to a first virtual router; and
- a processor coupled to the routing table, the processor configured to:
  - (a) in response to receiving a first packet in a first data stream, send the first packet to the first virtual router along the first default path;
  - (b) in response to receiving a second packet from the first data stream, send the second packet to the first virtual router along the first default path; and
  - (c) in response to receiving a first instruction from the first virtual router to configure the edge router to route data such that at least a first portion of the first data stream is routed along a first path through a plurality of interconnected routers from a source to a destination, update the routing table with the first path.

9. The edge router of claim 8, wherein the processor is further configured to:
- (d) after the update in (c), receive a third packet from the first data stream; and
- (e) in response to receiving the third packet from the first data stream, send the third packet along the first path between the source and the destination.

10. The edge router of claim 8, wherein the first virtual router is selected from a plurality of virtual routers.

11. The edge router of claim 8, wherein the first path is selected such that data from the first data stream will pass through a particular machine.

12. A non-transitory computer-readable medium having instructions stored thereon that, when executed by at least one computing device, cause the at least one computing device to perform a method for virtually routing a first data stream from a source to a destination, the method comprising:
- (a) determining, by an edge router, a first virtual router and a pre-computed path from the edge router to the first virtual router;
- (b) in response to receiving a first packet in the first data stream by the edge router, sending, by the edge router, the first packet to the first virtual router along the pre-computed path;
- (c) receiving, by the edge router, a first instruction from the first virtual router to configure the edge router to route data such that at least a first portion of the first data stream is routed along a first path determined through a plurality of interconnected routers from the source to the destination; and
- (d) configuring the edge router according to the first instruction received in (c).

13. The computer-readable medium of claim 12, the method further comprising:
- (e) after the configuring in (d), receiving a second packet in the first data stream by the edge router; and
- (f) in response to the receiving the second packet in (e), sending the second packet along the first path identified in the first instruction received in (c) to the destination.

14. The computer-readable medium of claim 12, wherein the determining in (a) comprises selecting the first virtual router from a plurality of virtual routers.

15. The computer-readable medium of claim 12, wherein the receiving in (c) comprises receiving, by the edge router, the first instruction from the first virtual router to configure the edge router to route data such that at least the first portion of the first data stream is routed along the first path through the plurality of interconnected routers from the source to the destination, and at least a second portion of the first data stream is routed along a second path, different from the first path, through the plurality of interconnected routers from the source to the destination.

16. The computer-readable medium of claim 15, wherein a determination of the first path and the first portion, and the second path and the second portion in (c) is made such that a pre-determined quality-of-service requirement by the first data stream is met.

17. The computer-readable medium of claim 12, wherein the first path is selected from a plurality of different paths connecting the source to the destination based on a relative amount of available capacity on the plurality of different paths.

18. The computer-readable medium of claim 12, wherein the first path is selected from a plurality of different paths connecting the source to the destination based at least on one of a relative latency, jitter, or packet loss on the plurality of different paths.

19. A computer-implemented method for virtually routing a first data stream from a source to a destination through a plurality of interconnected routers, comprising:
- (a) receiving a first packet in the first data stream at a virtual router;
- (b) transmitting the first packet to the destination on a pre-computed path from the virtual router to the destination;
- (c) determining, by the virtual router, a first path through the plurality of interconnected routers from the source to the destination; and
- (d) configuring each router in the first path to route data from the first data stream along the first path;
- (e) receiving a message from a router along the first path indicating that the router that sent the message has not received data from the first data stream for a predetermined period of time;
- (f) for each respective router along the first path, determining, by the virtual router a routing table that does not indicate where to route data from the first data stream; and
- (g) for each of the respective routers, transmitting the routing table determined in (f) to configure the respective router.

20. The computer-implemented method of claim 19, wherein the configuring in (d) is performed repeatedly starting with configuring a last router in the first path and ending with configuring a first router in the first path, wherein the last router is closest to the destination, and the first router is closest to the source.

21. The computer-implemented method of claim 19, further comprising:
- (h) receiving, at a virtual routing server, a second packet from the first data stream from the source at the virtual router; and
- (i) transmitting the second packet over the pre-computed path from the virtual router to the destination.

22. The computer-implemented method of claim 19, wherein the determining in (c) comprises selecting the first path from a plurality of different paths connecting the source to the destination based on a relative amount of available capacity on the plurality of different paths.

23. The computer-implemented method of claim 19, wherein the determining in (c) comprises selecting the first path from a plurality of different paths connecting the source to the destination based at least on one of a relative latency, jitter, or packet loss on the plurality of different paths.

24. The computer-implemented method of claim 19, wherein the determining in (c) comprises determining the first path such that data from the first data stream will pass through a particular machine.

25. The computer-implemented method of claim 24, wherein the determining in (c) further comprises selecting the particular machine from a plurality of machines having a particular class.

26. A computer-implemented method for virtually routing a first data stream from a source to a destination through a plurality of interconnected routers, comprising:

(a) receiving a first packet in the first data stream at a virtual router;

(b) transmitting the first packet to the destination on a pre-computed path from the virtual router to the destination;

(c) determining, by the virtual router, a first path through the plurality of interconnected routers from the source to the destination and determining, by the virtual router, a second path through the plurality of interconnected routers from the source to the destination such that at least the a first portion of the first data stream is routed along the first path through the plurality of interconnected routers from the source to the destination, and at least a second portion of the first data stream is routed along a second path, different from the first path, through the plurality of interconnected routers from the source to the destination:

(d) configuring each router in the first path to route data from the first data stream along the first path.

* * * * *